United States Patent Office 3,240,726
Patented Mar. 15, 1966

3,240,726
POLYURETHANES PREPARED FROM ISO-
CYANATO PHOSPHORUS COMPOUNDS
Günther Oertel, Cologne-Flittard, Hans Holtschmidt,
Cologne-Stammheim, Günther Nischk, Leverkusen, and
Günther Braun, Cologne-Flittard, Germany, assignors
to Farbenfabriken Bayer Aktiengesellschaft, Lever-
kusen, Germany, a German corporation
No Drawing. Filed Aug. 22, 1961, Ser. No. 133,032
Claims priority, application Germany, Aug. 25, 1960,
F 31,973
7 Claims. (Cl. 260—2.5)

This invention relates to phosphorus compounds and more particularly to isocyanato phosphorus compounds and urethane obtained therefrom.

Isocyanato phosphorus compounds have been prepared heretofore in which the —NCO group is bonded directly to the phosphorus atom and also where the —NCO group is bonded to the phosphorus containing entity through an oxygen or sulfur atom. The phosphorus compounds which have the isocyanate bonded directly to the phosphorus entity suffer from the disadvantage that they can only be produced in very low yield from the corresponding phosphoric acid chlorides reacted with silver cyanate. The isocyanates which are bonded to phosphorus through an oxygen bearing entity are an improvement over the isocyanates bonded directly to phosphorus but these are only obtainable by multi-stage processes so that their use is often not economical.

The production of economical phosphorus containing isocyanates is advantageous in order to obtain chemical raw materials which can be used for the production of flame-resistant polyurethane plastics. Where polyurethane products have been produced heretofore by the addition of chemically inert phosphorus containing compounds, the protection against flammability is often lost because of the tendency of the low molecular weight additives to exude from the finished product. Attempts to overcome this disadvantage by the use of halogen containing polyols has not been entirely satisfactory because the polyurethane products are often brittle and furthermore do not have the flame-resistance which is desired in many cases.

It is therefore an object of this invention to provide improved isocyanato phosphorus compounds and a convenient process for the production thereof. Another object of this invention is to provide improved polyurethane plastics and an improved process for their preparation. Still a further object of this invention is to provide isocyanato phosphorus compounds adapted to impart a flame-resistant property to polyurethane plastics. Another object of the invention is to provide isocyanato phosphorus compounds from heretofore available organic polyisocyanates which are free of phosphorus. Still another object of this invention is to provide improved flame-resistant cellular polyurethane plastics, non-porous polyurethane plastics and polyurethane coating compositions as well as processes for the preparation thereof.

The foregoing objects and others which will become apparent from the following description are accomplished in accordance with the invention, generally speaking, by providing phosphorus compounds having the formula

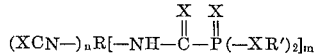

wherein X is oxygen or sulfur, R is an aliphatic, cycloaliphatic, araliphatic or aromatic radical preferably having a valence of from 2 to 4, R' represents an aliphatic or araliphatic radical preferably having a valence of 1 and n and m are whole numbers of from 1 to 3 and preferably n is 2 or 3 and polyurethane plastics prepared by reacting the said isocyanato phosphorus compounds with an organic compound containing at least two active hydrogen containing groups as determined by the Zerewitinoff method. In the above formula, the radicals represented by R and R' may also contain other substituents which are free of active hydrogen such as, for example, halogen such as chlorine and bromine and the like, epoxy, nitro, sulfonic acid groups and the like.

R in the above formula may be any suitable aliphatic radical having a valence of 2 to 4 such as, for example, methylene, ethylene, n-propylene, isopropylene, n-butylene, isobutylene, sec-butylene, t-butylene, n-amylene and various positional isomers thereof such as, for example, 1-methyl-butylene, 2-methyl-butylene, 3-methyl-butylene, 1,1 - dimethylpropylene, 1,2 - dimethylpropylene, 2,2-dimethylpropylene, 1-ethylpropylene, corresponding straight and branched chain isomers of hexylene, heptylene, octylene, nonylene, decylene, undecylene, dodecylene, tridecylene, tetradecylene, pentadecylene, hexadecylene, heptadecylene, octadecylene, nondecylene, eicosylene, and the like, methylidyne, ethylidene, ethylidyne, vinylidene, 1,2,3-propanetriyl, 1,3-propanediyl-2-ylidene, 1,2,6,8-octanetetrayl and the like, ethenylene, 1-propenylene, 2-propenylene, isopropenylene, 1-butenylene, 2-butenylene, 3-butenylene, the corresponding branched chain isomers such as, for example, 1-isobutenylene, 2-isobutenylene, 1-sec-butenylene, 2-sec-butenylene, 1-methyl-2-propenylene, 1-pentenylene, 2-pentenylene, 3-pentenylene, 4-pentenylene, 1-hexenylene, 2-hexenylene, 3-hexenylene, 4-hexenylene, 5-hexenylene, 3,3-dimethyl-1-butenylene, 2,3-dimethyl-1-butenylene, 2,3-dimethyl-2-butenylene, 2,3-dimethyl-3-butenylene, 1-methyl-1-ethyl-2-propenylene and the various isomers of heptenylene, octenylene, nonenylene, decenylene, undecenylene, dodecenylene, tridecenylene, tetradecenylene, pentadecenylene, hexadecenylene, heptadecenylene, octadecenylene, nondecenylene, eicosenylene and the like.

R in the above formula may be any suitable cycloaliphatic radical such as, for example, 1,3-cyclopentaylene, 3-cyclohexene-1,2-ylene, cyclopentylidene-1-yl, cyclohexylidene-3,5-ylene.

R in the above formula may be any suitable araliphatic radical such as, for example, benzylidene, cinnamylidene, benzylidine, phenyl ethylidene, phenyl isopropylene, 3-phenyl butane diylidene and the like.

R in the above formula may be any suitable aromatic radical such as, for example, phenylene (o, m and p), tolylene, naphthylene, as well as the radicals

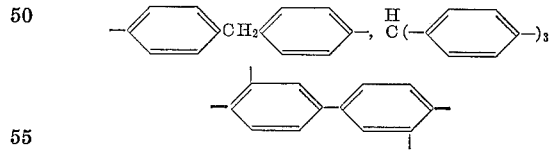

and the like.

Any suitable aliphatic radical may be R' in the above formula including, for example, methyl, ethyl, n-propyl, isopropyl, n-butyl, isobutyl, sec-butyl, t-butyl, n-amyl, the various positional isomers thereof such as, for example, 1-methyl-butyl, 2-methyl-butyl, 3-methyl-butyl, 1,1-dimethylpropyl, 1,2-dimethylpropyl, 2,2-dimethylpropyl, 1-ethylpropyl, the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl, methylidyne, ethylidene, ethylidyne, vinylidene, 1,2,3-propanetriyl, 1,3-propanediyl-2-ylidene, ethenyl, 1-propenyl, 2-propenyl, isopropenyl, 1-butenyl, 2-butenyl, 3-butenyl, corresponding branched chain isomers such as, for example, 1-isobutenyl, 2-isobutenyl, 1-sec-butenyl, 2-sec-butenyl, 1- methylene-2-propenyl, 1-pentenyl, 2-pentenyl, 3-pentenyl, 4-pentenyl, corresponding branched chain isomers such as, for example, 1-hexenyl, 2-hexenyl, 3-hexenyl, 4-hexenyl, 5-hexenyl, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl; and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like.

Any suitable araliphatic radical may be the radical R' in the above formula such as, for example, benzyl, alpha-phenyl-ethyl, beta-phenyl-ethyl, alpha-phenyl-propyl, beta-phenyl-propyl, gamma-phenyl-propyl, alpha-phenyl-isopropyl, beta-phenyl-isopropyl, alpha-phenyl-butyl, beta-phenyl-butyl, gamma-phenyl-butyl, delta-phenyl-butyl, alpha-phenyl-isobutyl, beta - phenyl - isobutyl, gamma-phenyl-isobutyl, alpha-phenyl-sec-butyl, beta-phenyl-sec-butyl, gamma-phenyl-sec-butyl, beta-phenyl-t-butyl, alpha'-naphthyl-methyl, beta'-naphthyl-methyl and the like, alpha-phenyl-ethenyl, beta-phenyl-ethenyl, alpha-phenyl-1-propenyl, beta-phenyl-1-propenyl, gamma - phenyl - 1-propenyl, alpha-phenyl-2-propenyl, beta-phenyl-2-propenyl, gamma-phenyl-2-propenyl, beta-phenyl-isopropenyl, phenyl derivatives of the isomers of butenyl, pentenyl, hexenyl, heptenyl up to and including eicosenyl and the like.

The phosphorus compounds of the invention are preferably prepared by reacting an organic polyisocyanate with a trialkyl phosphite according to an Arbusov reaction. The process of the invention may be illustrated, for example, by the reaction of one mol of tolylene diisocyanate, one mol of hydrochloric acid and one mol of trichloroethyl phosphite. This reaction proceeds in accordance with the following equation:

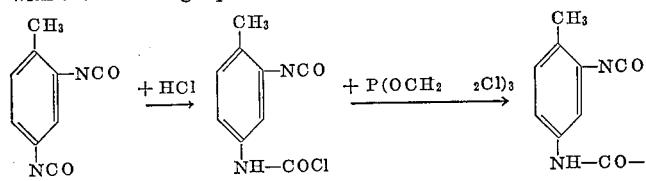

These reactions proceed very smoothly even at room temperature, in the presence of inert solvents, such as chlorobenzene or toluene, and lead to the corresponding phosphorus isocyanates in theoretical yield. Since on the one hand phosphines, phosphine oxides and phosphites in known manner constitute polymerizing agents for isocyanate groups, and carbamic acid halides on the other hand are in equilibrium with isocyanate and hydrogen halides, the latter as is known decomposing trialkyl phosphites to dialkyl phosphites and alkyl halides, various types of secondary reactions were to be expected with reactions of the type referred to, but surprisingly the reactions take place in a completely homogeneous manner under the said conditions.

All known isocyanates, provided they contain more than one —NCO group, are in general suitable as starting materials for the preparation of the phosphorus isocyanates such as, for example, toluylene-2,4-diisocyanate, toluylene-2,6-diisocyanate, 4,4' - diphenylmethane diisocyanate, 1,5-naphthalene diisocyanate, m-phenylene diisocyanate, 4,4',4''-triphenylmethane triisocyanate, phosphoric acid-(p-isocyanatophenyl)-triester, 1,4-cyclohexane diisocyanate, hexane-1,6-diisocyanate, furfurylidene diisocyanate and the like. The isocyanates can, of course, also contain substitutents such as alkoxy, for example methoxy, ethoxy, propoxy and the like, nitro groups, and particularly halogen atoms such as chlorine, bromine and the like. The carbamic acid halides obtained from these isocyanates can be reacted with any desired trialkyl phosphites, for example, trimethyl phosphite, trichloroethyl phosphite, tribromoethyl phosphite or tributyl phosphite, triethyl phosphite, methyl diethyl phosphite, chloroethyl dimethyl phosphite, dimethyl benzyl phosphite, tribenzyl phosphite, dimethyl phenyl ethyl phosphite and the like.

Specific examples of the resulting phosphorus isocyanates contemplated by the present invention are

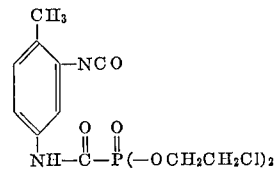

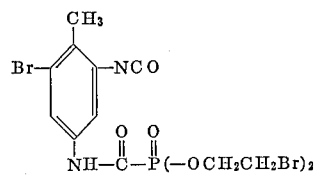

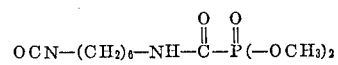

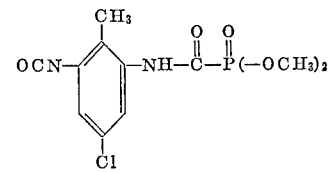

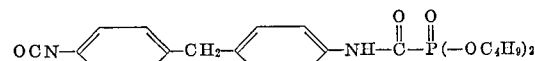

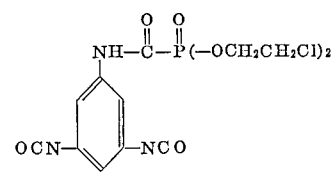

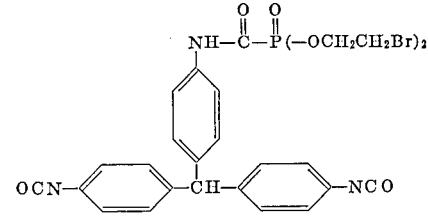

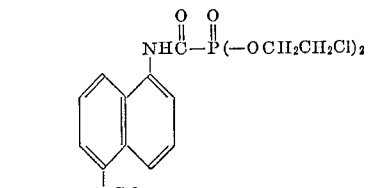

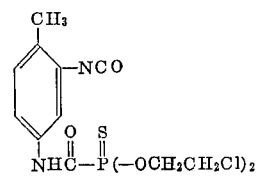

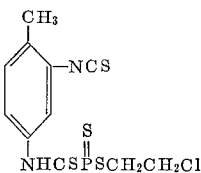

Furthermore, the addition of dialkyl phosphites to polyisocyanates, for example the addition of dimethyl phosphite to toluylene-2,4-diisocyanate, is a suitable method for the preparation of the starting materials according to the invention. The use of agents splitting off isocyanates also comes within the scope of the process according to the invention; these agents are adducts of the phosphorus-containing isocyanates or polyisocyanates which have been reacted with phenols, malonic esters and the like, so they will again liberate the isocyanates on being heated. Monohydric phenols such as phenol, cresol and the like are preferred for the preparation of compounds capable of splitting off isocyanate. Instead of the free phosphorus-containing isocyanates, it is also possible to employ the addition products of an excess of these isocyanates with polyhydric alcohols, such as butanediol, trimethylolpropane, pentaerythritol and the like, the said addition products containing free —NCO groups.

When the phosphorus-containing isocyanates have only one free —NCO group, the concurrent use of polyvalent isocyanates which may be free of phosphorus is necessary for the preparation of polyurethane plastics. However, the polyvalent phosphorus-containing isocyanates of the above formula are preferably used with polyisocyanates which are free from phosphorus. Any suitable free polyisocyanate may be used including aliphatic, aromatic and the like, polyisocyanates for example alkylene isocyanates, such as tetra- and hexamethylene diisocyanate, arylene diisocyanates and their alkylation products, such as the phenylene (o, m and p), 1,5-naphthylene, 4,4'-diphenylmethane, 2,4- and 2,6-toluylene, diisopropyl benzene and triisopropyl benzene diisocyanates and p,p',p''-triphenylmethane triisocyanates, aralkyl diisocyanates such as 1-(isocyanatophenyl)-ethyl isocyanate or the xylylene diisocyanates, as well as polyisocyanates of the above type substituted by various substituents such as OR, where R is alkyl, such as methyl, ethyl, propyl and the like; aryl such as phenyl and the like; NO$_2$, Br, Cl; the reaction products of the above isocyanates with less than equivalent quantities of polyhydroxy compounds such as trimethylolpropane, 1,2,6-hexane-triol, glycerine, 1,4-butanediol and the like, as well as polyisocyanates masked for example with phenols and polymerized isocyanates with isocyanurate rings are also to be considered as suitable.

The phosphorus compounds of the invention may be used for the preparation of flame-resistant polyurethane plastics by the reaction thereof with any suitable organic compound containing at least two active hydrogen containing groups as determined by the Zerewitinoff method. It is preferred that these compounds have a molecular weight of at least about 600 but it is possible to use compounds which have a molecular weight below 600 and preferably below 500 in conjunction with the higher molecular weight compounds in the preparation of polyurethane plastics.

In the preparation of the improved polyurethane plastics of the invention, any suitable compound containing at least two active hydrogen containing groups as determined by the Zerewitinoff method, said groups being reactive with an —NCO group, may be used. The molecular weight and the extent of branching within the compound containing active hydrogen will strongly influence the properties of the resulting product. It is preferable to employ at least one compound containing active hydrogen which has a molecular weight of at least about 600. Compounds having a molecular weight from about 1000 to about 10,000, an hydroxyl number of from about 20 to about 225 and where applicable, an acid number not substantially greater than about 5 are preferred. Most preferred are those compounds which have a molecular weight within the range of from about 1500 to about 2000, an hydroxyl number not substantially greater than about 56 and, where applicable, an acid number within the range of about 0 to about 2. Thus, any suitable compound which contains at least two reactive hydrogen atoms as determined by the Zerewitinoff method (i.e. when added to a Grignard solution of methyl iodide, will liberate methane by decomposition of the Grignard solution) may be used. Included, then, are organic compounds containing at least two active hydrogen containing groups such as, for example, OH, NH$_2$, —RNH— wherein R is an organic radical such as methyl, phenyl and the like, COOH, enolizable carbonyl groups and the like. More particularly, one may use polyesters, polyesteramides, polyacetals, polyethers, polythioethers and the like which contain reactive groups of the class described above. Polyesters may be prepared by well-known processes such as, for example, the condensation of polyhydric alcohols with polycarboxylic acids. Polyester amides may be prepared, for example, by the condensation of polycarboxylic acids with amino alcohols. Polyacetals may be prepared, for example, by the condensation of hydroxyl substituted acetals and the like. Polyethers may be prepared, for example, by the condensation of alkylene oxides and/or polyhydric alcohols. Polythioethers may be prepared, for example, by the condensation of thioglycols and/or thioether glycols and may contain an arbitrary number of thioether groups as well as at least one hydroxyl group in the beta or gamma position to a sulfur atom.

In the foregoing preparation of the organic compound having reactive hydrogen atoms, one may use ethylene oxide, propylene oxide, butylene oxide, amylene oxide and the like where alkylene oxides are called for. Where polyhydric alcohols are used, one may employ for example ethylene glycol, 1,3-propylene glycol, 1,4-butylene glycol, glycerol, trimethylolpropane, pentaerythritol and the like. If polycarboxylic acids are called for, one may use, for example, adipic acid, succinic acid, glutaric acid, phthalic acid, tetrahydrophthalic acid, maleic acid and their anhydrides such as phthalic anhydride and the like. If amino alcohols are called for, one may use, for example, ethanol amine, triethanol amine and the like. Where acetals are called for, one may use compounds such as beta-hydroxy diethyl acetal.

It is often advantageous to employ, in addition to the higher molecular weight compounds having active hydrogen containing groups, compounds having a molecular weight below about 500 which have at least two active hydrogen containing groups. Examples of compounds of this type include water, polyhydric alcohols, such as, for example, ethylene glycol, propylene glycol, 1,3-butylene glycol, 1,4-butylene glycol, glycerol, trimethylolpropane, 1,5-naphthylene-beta-hydroxyethylether, and the like, diamines, such as, for example, o-dichlorobenzidine, 2,5-dichlorophenylene diamine, 3,3'-dichlorodiaminodiphenyl methane and the like, carbonamides such as, for example, adipic acid dibutanol amide and the like, urethanes such as, for example, ethylene-beta-hydroxy ethyl urethane and the like, ureas such as, for example, beta-hydroxy ethyl urea, and compounds containing tertiary nitrogen atoms such as, for example, diethyl ethanol amine.

In accordance with the invention, one may prepare rigid, semi-rigid or flexible porous and non-porous polyurethane plastics depending on the choice of reactants and reaction conditions. Thus, one may prepare high-grade non-porous polyurethane elastomeric materials as well as rigid and flexible porous polyurethane plastics, coatings and molding compositions from the above-described reactants. Elastomeric rubber-like material may be prepared, for example, by reacting under substantially anhydrous conditions compounds having at least two hydrogen atoms reactive with an —NCO group and a molecular weight above about 800 as more fully disclosed above with the phosphorus containing isocyanates of the invention in an amount in excess of that necessary for strictly linear lengthening of the chain to prepare a storage stable intermediate having terminal —NCO groups and thereafter reacting the isocyanate terminated product obtained with a compound having a molecular weight below about 500 more fully disclosed above. In this way, a polyurethane plastic is obtained which may be either shaped immediately or at a later stage. If the chain lengthened material obtained from the compound having a molecular weight above about 800 and the isocyanate are reacted with sufficient water, porous plastics are obtained. On the other hand, lesser amounts of water and the like may be used to prepare non-porous rubber-like plastics, if the water is combined on suitable processing equipment conventionally used in the rubber industry to remove any gases entrapped in the reaction mixture. Suitable processes, techniques and catalysts are disclosed, for example, in United States Reissue Patent 24,514 to Hoppe et al., issued August 12, 1958, and U.S. Patent 2,729,618 to Müller et al., issued January 3, 1956.

According to a further embodiment of the invention, the predominately linear condensation of polymerization products containing reactive hydrogen atoms and having a molecular weight above about 800 can be reacted with an excess of the phophorus containing isocyanates and the resulting product which has free —NCO groups thereafter reacted with an excess of the compounds having a molecular weight below about 500 and containing reactive hydrogen atoms. The active hydrogen atoms terminated product can then be reacted with a further quantity of an organic polyisocyanate which may or may not contain phosphorus to obtain a polyurethane plastic having improved thermal stability. It is also possible to proceed in the converse manner preparing the initial product from an organic hydrocarbon polyisocyanate and thereafter reacting it with the phosphorus containing isocyanate to obtain the improved polyurethane plastics of the invention.

In the production of cellular polyurethane plastics, in accordance with the invention, linear or branched condensation or polymerization products containing active hydrogen containing groups and preferably having a molecular weight of at least about 600 are caused to react with the phosphorous containing isocyanates more fully disclosed above or mixtures thereof with oragnic polyisocyanates free of phosphorus or even those heretofore known phosphorus isocyanates in the presence of a blowing agent and an accelerator mixture to produce a cellular polyurethane plastic. Suitable apparatus, procedures, accelerator mixtures and organic polyisocyanates which do not contain phosphorus are disclosed, for example, in United States Reissue Patent 24,514 to Hoppe et al., issued August 12, 1958.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

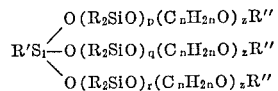

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

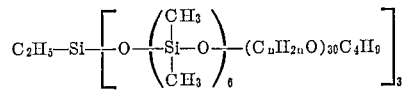

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are, for example tin compounds such as stannous chloride, tin salts of carboxylic acids, such as dibutyl tin di-2-ethyl hexoate, tin alcoholates such as stannous octoate, as well as other organo metallic compounds such as are disclosed in U.S. Patent 2,846,408, and in copending application Serial No. 835,450.

Coatings, films and laminated materials may be prepared from condensation or polymerization products containing active hydrogen containing groups and preferably having a molecular weight above about 600 which are applied to a substrate in an inert organic solvent such as xylene, benzene, toluene, diethyl ether of ethylene glycol and the like in conjunction with the phosphorus containing iso-cyanates which may desirably contain dimerized diisocyanate radicals and thereafter allowed to react in the cold or after heating subsequent to evaporating the solvent if the mixtures are applied in a solvent solution such as xylene. The aforementioned condensation or polymerization products are preferably branched products having a molecular weight above about 600.

According to a still further embodiment of the invention, molding compositions may be prepared if the condensation products having a molecular weight exceeding about 600 and containing active hydrogen containing groups are combined with relatively large quantities of fillers, for example, sawdust, chalk, carbon black and/or colloidal silica and the phosphorus containing polyisocyanates under substantially anhydrous conditions and then poured into a mold and allowed to cure. Suitable procedures and catalysts are disclosed in U.S. Patent 2,729,618 to Müller et al., issued January 3, 1956.

The invention is further illustrated by the following examples in which the parts are by weight unless otherwise specified.

EXAMPLE 1

(a) *Production of the starting materials*

About 36.5 parts of dry hydrochloric acid gas are introduced at about 20 to 40° C. into a solution of about 174 parts of toluylene-2,4-diisocyanate in about 700 parts of chlorobenzene. About 270 parts of trichloroethylphosphite are added dropwise at about 20 to 50° C. to the carbamic acid chloride suspension which has formed, the addition taking place with cooling. The reaction mixture is thereafter stirred for about one hour at about 50° C. and finally the solvent is evaporated in vacuo. About 381 parts (about 100 percent of the theoretical) of the desired phosphorus-containing isocyanate remain in the residue in the form of a yellow oil.

| Analysis | C | H | N | P | NCO |
|---|---|---|---|---|---|
| Calculated | 41.0% | 3.9% | 7.35% | 8.1% | 11.0% |
| Found | 41.8% | 3.85% | 6.97% | 7.5% | 10.3% |

About 876 parts of adipic acid are condensed with about 586 parts of oleic acid and about 1,540 parts of trimethylolpropane by heating to about 190° C. in a stream of carbon dioxide. As soon as the vapor temperature of the water of reaction in the column has fallen to about 90° C., further condensation takes place under reduced pressure. Heating is continued for about 10 hours at about 190° C. under vacuum of about 30 mm. A brownish yellow viscous oil is obtained (OH number about 370; acid number substantially 0).

(b) *Production of a foam material*

About 1500 parts of this polyester are mixed at room temperature with about 1300 parts of the phosphorus-containing isocyanate obtained according to (a). The mixture is gradually heated to from about 100° C. to about 110° C. while stirring and stirring is continued for another hour at this temperature. A resin (OH number 157) which is viscous at room temperature, is obtained. About 100 parts of this phosphorus-containing resin are thoroughly mixed with about 1 part of permethylated aminoethyl piperazine, about 6 parts of sodium castor oil sulphate (50% $H_2O$) and about 0.3 part of polysiloxane-polyalkylene glycol copolymer having the formula

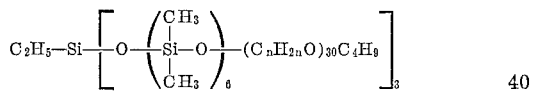

wherein $(C_nH_{2n}O)$ is a mixed polyoxyethylene and oxypropylene block copolymer containing about 17 oxyethylene units and about 13 oxypropylene units.

This mixture is stirred with about 92 parts of about 90 percent 4,4′-diphenyl methane diisocyanate obtained by the phosgenation of the crude amine obtained from formaldehyde and aniline in a ratio that gives 90 percent of the corresponding amine, and poured into molds. An incombustible, finely porous foam material is obtained which has the following physical properties:

Weight per unit density _____kg./m.$^3$__ 46
Compressive strength _____kg./cm.$^2$__ 3.2
Impact toughness _____kg./cm__ 0.3
Hot-bending strength _____° C__ 105
Water absorption _____percent__ 1.2

EXAMPLE 2

About 50 parts of the phosphorus-containing resin (OH number 157) obtained according to Example 1(b) are mixed with about 50 parts of a trihydric propolylated phosphoric acid with an OH number of about 397, about 2 parts of permethylated aminoethyl piperazine, about 6 parts of sodium castor oil sulphate (50% $H_2O$) and about 0.3 part of polysiloxane-polyalkylene glycol copolymer of Example 1. With addition of about 124 parts of about 90 percent 4,4′-diphenylmethane diisocyanate of Example 1, the mixture starts to foam and is poured into molds.

A difficulty inflammable, non-shrinking foam material is obtained with the following physical properties:

Weight per unit density _____kg./m.$^3$__ 40
Compressive strength _____kg./cm.$^2$__ 2.9
Impact toughness _____kg./cm__ 0.4
Hot-bending strength _____° C__ 125
Water absorption _____percent__ 2.3

EXAMPLE 3

About 1500 parts of the polyester of Example 1(a) are reacted as in Example 1(b) with about 900 parts of the isocyanate obtained according to Example 1(a). A phosphorus-containing resin (OH number 178) which is slightly viscous at room temperature is obtained. About 100 parts of this resin are mixed with about 1 part of permethylated aminoethyl piperazine, about 6 parts of sodium castor oil sulphate (50% $H_2O$) and about 0.3 part of the polysiloxane-polyalkylene glycol copolymer of Example 1 and thereafter foamed after adding about 99 parts of about 90 percent 4,4′-diphenylmethane diisocyanate of Example 1. The foam material is incombustible and has the following physical properties:

Weight per unit density _____kg./m.$^3$__ 42
Compressive strength _____kg./cm.$^2$__ 2.8
Impact toughness _____kg./cm__ 0.4
Hot-bending strength _____° C__ 118
Water-absorption _____percent__ 1.3

EXAMPLE 4

(a) *Production of the starting materials*

110 parts of dry hydrochloric acid gas are introduced at 35 to 40° C., into a solution of 522 parts toluylene diisocyanate (isomer mixture of 2,4 and 2,6; 65 to 35%) in 2000 parts of chlorobenzene. After stirring for one hour at 40° 810 parts of trichloroethylphosphite are added at 40 to 50° C. to the suspension which has formed. The reaction mixture is thereafter stirred for one hour without exothermic heating and finally the solvent and the dichloroethane are evaporated in vacuo at waterbath temperature. 1150 parts (100 percent of the theoretical) of the desired phosphorus-containing isocyanate remain in the residue in the form of a yellow oil. The reaction product is a mixture of two isocyanates of the following formulae:

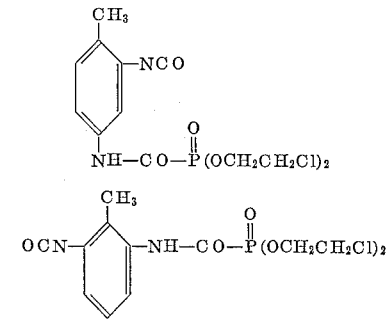

with a NCO-content of 13% (calculated 11%).

(b) *Production of a foam material*

100 parts of a polyester prepared from a adipic acid, phthalic acid, oleic acid and trimethylolpropane and having an OH-number of 380 are thoroughly mixed with 2 parts of permethylated aminoethyl piperazine, 0.5 part of polysiloxane-polyalkylene glycol copolymer of Example 1 and 6 parts of sodium castor oil sulphate (50% $H_2O$). The mixture is foamed with 135 parts of the 90% 4,4′-diphenyl methane diisocyanate of Example 1 and 25 parts of the phosphorus-containing isocyanate obtained according to (a). An incombustible, finely porous foam material is obtained which has the following physical properties:

Weight per unit density _____kg./m.$^3$__ 30
Compressive strength _____kg./cm.$^2$__ 1.2
Impact toughness _____kg./cm__ 0.5
Hot-bending strength _____° C__ 122
Water absorption _____percent__ 1

EXAMPLE 5

(a) *Production of the starting materials*

759 parts of 5-bromo-toluylene-2,4-diisocyanate are reacted with 110 parts of dry hydrochloric acid gas and 810 parts of trichloroethylphosphite in chlorobenzene as a solvent in accordance with Example 4(a). There are obtained 1400 parts (100 percent of the theoretical) of the isocyanate of the formula:

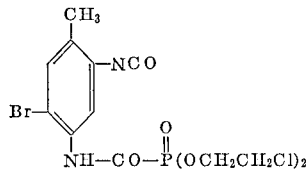

(b) *Production of a foam material*

100 parts of the polyester of Example 4 are mixed with 1 part of 1-methyl-4-dimethyl aminoethyl piperazine, 0.3 part of dibutyltin-dilaurate, 0.5 part of polysiloxane-polyalkylene glycol copolymer of Example 1 and 6 parts of sodium castor oils sulphate (50% $H_2O$). The mixture is foamed by adding 93 parts of the 90 percent 4,4'-diphenyl methane diisocyanate of Example 1, 25 parts of toluylene diisocyanate and 25 parts of the phosphorus-containing isocyanate obtained according to (a). An incombustible, non-shrinking foam material is obtained which has the following physical properties:

| | | |
|---|---|---|
| Weight per unit density | kg./m.$^3$ | 30.0 |
| Compressive strength | kg./cm.$^2$ | 1.2 |
| Impact toughness | kg./cm | 0.5 |
| Hot-bending strength | ° C | 122 |
| Water absorption | percent | 1 |

EXAMPLE 6

(a) *Production of the starting materials*

213 parts of chlorine are introduced at 20° C. into a solution of 522 parts of 2,4-toluylene diisocyanate and 1 part of iodine in 1000 parts of chlorobenzene. 810 parts of trichloroethylphosphite are added dropwise at 30 to 40° C. to a suspension which has formed. After the exothermic reaction is substantially completed, a clear solution is obtained, which is stirred for one hour at 50° C. and then concentrated in vacuo. 1250 parts of the phosphous-containing isocyanate of the formula

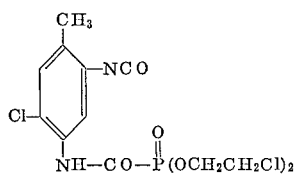

remain in the residue in the form of a yellow oil.

(b) *Production of a foam material*

100 parts of the polyester of Example 4 are mixed with 1 part of 1-methyl-4-dimethyl aminoethyl piperazine, 0.3 part of dibutyltin-dilaurate, 0.5 part of polysiloxane-polyalkylene glycol copolymer of Example 1 and 6 parts sodium castor oil sulphate (50% $H_2O$). The mixture is foamed by adding 133 parts of 4,4'-diphenyl methane diisocyanate (90 percent) and 25 parts of the phosphorus-containing isocyanate obtained according to (a). An incombustible rigid foam material is obtained which has the following physical properties.

| | | |
|---|---|---|
| Weight per unit density | kg./m.$^3$ | 47.0 |
| Compressive strength | kg./cm.$^2$ | 2.9 |
| Impact toughness | kg./cm | 0.3 |
| Hot-bending strength | ° C | 146 |
| Water absorption | percent | 3 |

EXAMPLE 7

(a) *Production of the starting materials*

522 parts of toluylene diisocyanate (isomer mixture of 2,4 and 2,6; 65 percent to 35 percent) are reacted with 213 parts of chlorine and 1080 parts of technical grade trichloroethylphosphite (75%) in accordance with the procedure of Example 6. The reaction product consists of 1450 parts (100 percent of the theoretical) of a chlorine- and phosphorus-containing isocyanate in the form of a reddish oil.

(b) *Production of a foam material*

50 parts of the polyester of Example 4 and 50 parts of the addition product phosphoric acid and propylene oxide (OH-number 400) are mixed together with 2 parts of 1-methyl-4-dimethyl aminoethyl piperazine, 0.1 part of dibutyltin-dilaurate, 0.5 part of polysiloxane-polyalkylene glycol copolymer of Example 1 and 6 parts of sodium castor oil sulphate (50% $H_2O$). The mixture is foamed by adding 137 parts of the 4,4'-diphenylmethane diisocyanate of Example 1 (90%) and 25 parts of the chlorine- and phosphorus-containing isocyanate obtained according to (a). The foaming mixture is poured into molds and yields an incombustible rigid foam material with the following physical properties:

| | | |
|---|---|---|
| Weight per unit density | kg./m.$^3$ | 42.0 |
| Compressive strength | kg./cm.$^2$ | 2.1 |
| Impact toughness | kg./cm | 0.5 |
| Hot-bending strength | ° C | 122 |
| Water absorption | percent | 2 |

EXAMPLE 8

100 parts of the mixture of the polyester and the propoxylated phosphoric acid, as described in Example 7, are mixed together with the following compounds: 2 parts of 1-methyl-4-dimethyl aminoethyl piperazine, 0.1 part of dibutyltin-dilaurate, 0.5 part of polysiloxane-polyalkylene glycol copolymer of Example 1 and 2 parts of sodium castor oil sulphate (50% $H_2O$). Foaming is achieved by adding 111 parts of 4,4'-diphenyl methane diisocyanate, 10 parts of the chlorine- and phosphorus-containing isocyanate of Example 7(a) and 30 parts of trichlorofluormethane. An incombustible, nonshrinking, finely porous foam material is obtained showing the following physical properties:

| | | |
|---|---|---|
| Weight per unit density | kg./m.$^3$ | 27.0 |
| Compressive strength | kg./cm.$^2$ | 1.4 |
| Impact toughness | kg./cm | 0.4 |
| Hot-bending strength | ° C | 109 |
| Water absorption | percent | 4 |

EXAMPLE 9

(a) *Production of the starting materials*

71 parts of chlorine are passed at 10 to 20° C. into 1934 parts of toluylene diisocyanate in presence of a catalytic amount of iodine. 302 parts of technical grade trichloroethylphosphite (89 percent) are added dropwise into the suspension which has formed. After the exothermic reaction has been completed a vacuum is applied to remove the formed dichloroethane as byproduct. 2200 parts of a yellow, clear liquid are obtained as a residue. The liquid is a 20 percent solution of the isocyanate mixture, described in Example 4(a) in toluylene diisocyanate. The NCO-content of the mixture is 40 percent (calculated 39.5 percent).

(b) *Production of a foam material*

100 parts of the polyester of Example 4 are mixed with 2 parts of 1-methyl-4-dimethyl aminoethyl piperazine and 6 parts of sodium castor oil sulphate (50% $H_2O$). After adding 108 parts of the phosphorus-containing isocyanate solution obtained according to (a) a foaming mixture is obtained yielding an incombustible foam showing the following mechanical properties:

| | | |
|---|---|---|
| Weight per unit density | kg./m.$^3$ | 38.0 |
| Compressive strength | kg./cm.$^2$ | 1.6 |
| Impact toughness | kg./cm | 0.3 |
| Hot-bending strength | ° C | 141 |
| Water absorption | percent | 4 |

EXAMPLE 10

(a) *Production of the starting materials*

1725 parts of 4,4'-diphenyl methane diisocyanate are reacted with 71 parts of chlorine and 302 parts of trichloroethylphosphite (89 percent) in accordance with Example 9(a). 1991 parts of a dark oil are obtained as a reaction product which consists of a 26 percent solution of the phosphorus-containing isocyanate of the formula:

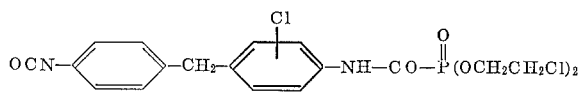

in 4,4'-diphenyl methane diisocyanate. The NCO-content of the solution is 24 percent.

(b) *Production of a foam material*

100 parts of the polyester of Example 4 are mixed with 2 parts of 1-methyl-4-dimethyl aminoethyl piperazine and 6 parts of sodium castor oil sulphate (50% $H_2O$). After adding of 169 parts of the isocyanate obtained according to (a) the resulting foaming mixture is poured into molds and yields an incombustible rigid foam which has the following physical properties:

| | |
|---|---|
| Weight per unit density kg./m.³ | 48.0 |
| Compressive strength kg./cm.² | 3.4 |
| Impact toughness kg./cm. | 0.2 |
| Hot-bending strength °C. | 150 |
| Water absorption percent | 2 |

EXAMPLE 11

(a) *Production of the starting materials*

106.5 parts of chlorine are passed at 10 to 20° C. into a solution of 261 parts of 2,4-toluylene diisocyanate in 750 parts carbontetrachloride in presence of a catalytic amount of iodine. Then 303 parts of triallylphosphite are added dropwise at 40 to 50° C. 425 parts of bromine are added at 0 to 10° C. to the resulting clear solution of the phosphorus-containing isocyanate of the following formula:

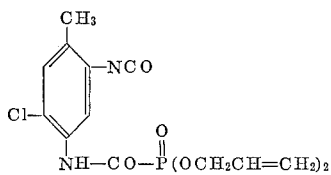

The bromine is added to the phosphous-containing isocyanate under the evolution of heat. A brown, viscous solution is obtained which after evaporation in vacuo yields the desired isocyanate of the formula:

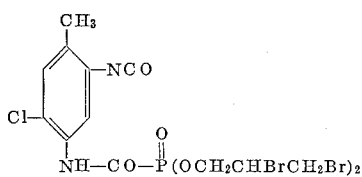

as a viscous brown resin. The product is completely soluble in the isocyanate and is employed as a 30 percent solution in toluylene diisocyanate (NCO-content 38 percent).

(b) *Production of a foam material*

100 parts of a polyester prepared from adipic acid, diethylene glycol and trimethylolpropane and having an OH-number of 56 are mixed with 1 part of dimethylbenzylamine, 2 parts of a non-ionic emulsifier, 1 part of sodium castor oil sulphate (50% $H_2O$) and 1 part of water. This mixture is combined with 20 parts of toluylene diisocyanate and 20 parts of the 30 percent isocyanate solution, obtained as described under (a). An incombustible elastic foam is obtained showing the following physical properties:

| | |
|---|---|
| Weight per unit density kg./cm.³ | 43.0 |
| Tensive strength kg./cm.² | 1.2 |
| Elongation percent | 163 |
| Stauch-hardness 40% compression g./cm.² | 53.0 |
| Elasticity percent | 27 |
| Permanent elongation do | 14 |

EXAMPLE 12

100 parts of a 75 percent ethylacetate solution (NCO-content 14 percent) of the reaction product of 1 mol of trimethylolpropane and 3 mols of toluylene diisocyanate and 40 parts of the phosphorus-containing isocyanate (NCO-content 11 percent) obtained according to Example 6(a) are mixed together. 190 parts of this solution are added to 300 parts of a polyester solution consisting of 200 parts of a mixture of ethylacetate, butylacetate and glycolmonomethyletheracetate and 100 parts of a polyester prepared from 2.5 mols of adipic acid, 0.5 mol of phthalic acid anhydride and 4.3 mols of hexanetriol (OH-number 300; acid number 2). The lacquer solution is brushed on a smooth wood plate. The curing of the lacquer is finally completed within 3 days. The film is elastic and resistant against scratching. It does not burn, when touched for 30 seconds with a flame 10 cm. long.

EXAMPLE 13

(a) *Production of the starting materials*

1000 parts of the triisocyanate prepared from 1 mol of trimethylolpropane and 3 mols of toluylene diisocyanate are dissolved in 2000 parts of chlorobenzene. 555 parts of dry hydrochloric acid gas are introduced at 30 to 40° C. into the solution. 412 parts of trichloroethylphosphite are then added dropwise cooling. After the reaction has been substantially completed the clear solution is stirred for 1 hour at 50° C. and finally the solvent is evaporated in vacuo. 1400 parts (100 percent of the theoretical) of a viscous yellow resin (NCO-content 11%) remain in the residue. The resin is the diisocyanate of the following formula:

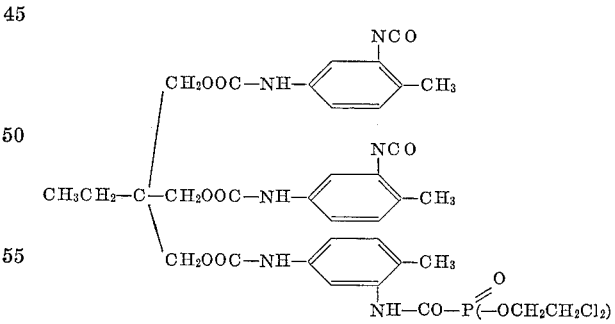

(b) *Production of a coating*

100 parts of the polyester of Example 12(a) are dissolved in 200 parts of the mixture of ethylacetate, butylacetate and glycolmonomethyletheracetate (1:1:1). The solution is combined with a solution of 200 parts of the phosphorus-containing diisocyanate, obtained according to (a) in 80 parts ethylacetate. 10 parts of a 1 percent solution of polyvinylacetate are added as a flowing agent. The lacquer solution is sprayed on a metal plate. The coating is heated for 1 hour up to 100° C. A film is obtained, which is resistant against solvents and scratching. It does not burn, when exposed for 60 seconds to a flame 10 cm. long.

It is to be understood that the foregoing examples are given for the purpose of illustration and that any other suitable organic polyisocyanate, trialkyl phosphite, organic compound containing active hydrogen containing groups, catalysts, stabilizers and the like could have been used in the working examples with satisfacory results provided that the teachings of this disclosure are followed.

The phosphorus compounds of the invention are useful for the preparation of polyurethane plastics as set forth above. These may in turn be used for the preparation of both sound and thermal insulation, cushions, gaskets, coatings for wood, metals and the like.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane plastic prepared by a process which comprises reacting an organic compound containing active hydrogen containing groups as determined by the Zerewitinoff method with phosphorus compound having the formula

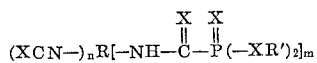

wherein X is selected from the group consisting of oxygen and sulfur, R is selected from the group consisting of an aliphatic, a cycloaliphatic, an araliphatic and an aromatic radical, R' is member selected from the group consisting of an aliphatic radical and an araliphatic radical and $n$ and $m$ are whole numbers of from 1 to 3, the sum of $n$ and $m$ being 2 to 4, with the proviso that when $n$ is 1 an organic polyisocyanate is included in the reaction mixture.

2. A cellular polyurethane plastic prepared by a process which comprises reacting in the presence of a blowing agent, an organic compound containing active hydrogen containing groups as determined by the Zerewitinoff method with a phosphorus compound having the formula

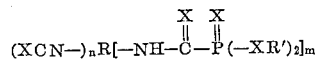

wherein X is selected from the group consisting of oxygen and sulfur, R is selected from the group consisting of an aliphatic, a cycloaliphatic, an araliphatic and an aromatic radical, R' is a member selected from the group consisting of an aliphatic radical and an araliphtic radical and $n$ and $m$ are whole numbers of from 1 to 3, the sum of $n$ and $m$ being 2 to 4, with the proviso that when $n$ is 1 an organic polyisocyanate is included in the reaction mixture.

3. A substantially non-cellular polyurethane plastic prepared by a process which comprises reacting under substantially anhydrous conditons an organic compound containing active hydrogen containing groups as determined by the Zerewitinoff method a phosphorus compound having the formula

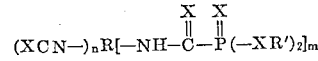

wherein X is selected from the group consisting of oxygen and sulfur, R is selected from the group consisting of an aliphatic, a cycloaliphatic, an araliphatic and an aromatic radical, R' is a member selected from the group consisting of an aliphatic radical and an araliphatic radical and $n$ and $m$ are whole numbers of from 1 to 3, the sum of $n$ and $m$ being 2 to 4, with the proviso that when $n$ is 1 an organic polyisocyanate is included in the reaction mixture.

4. A coating composition which comprises an inert organic solvent solution of the reaction product of an organic compound containing active hydrogen containing groups as determined by the Zerewitinoff method with a phosphorus compound having the formula

wherein X is selected from the group consisting of oxygen and sulfur, R is selected from the group consisting of an aliphatic, a cycloaliphatic, an araliphatic and an aromatic radical, R' is a member selected from the group consisting of an aliphatic radical and an araliphatic radical and $n$ and $m$ are whole numbers of from 1 to 3 the sum of $n$ and $m$ being 2 to 4, with the proviso that when $n$ is 1 an organic polyisocyanate is included in the reaction mixture.

5. A process for the preparation of polyurethane plastics which comprises reacting an organic compound containing at least two active hydrogen containing groups as determined by the Zerewitinoff method with a phosphorus compound having the formula

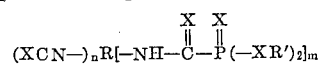

wherein X is selected from the group consisting of oxygen and sulfur, R is selected from the group consisting of an aliphatic, a cycloaliphatic, an araliphatic and an aromatic radical, R' is member selected from the group consisting of an aliphatic radical and an araliphatic radical and $n$ and $m$ are whole numbers of from 1 to 3, the sum of $n$ and $m$ being 2 to 4, with the proviso that when $n$ is 1 an organic polyisocylanate is included in the reaction mixture.

6. A process for the preparation of polyurethane plastics which comprises reacting a phosphorus compound having the formula

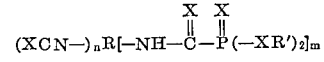

wherein X is selected from the group consisting of oxygen and sulfur, R is selected from the group consisting of an aliphatic, a cycloaliphatic, an araliphatic and an aromatic radical, R' is a member selected from the group consisting of an aliphatic radical and an araliphatic radical and $n$ and $m$ are whole numbers of from 1 to 3, the sum of $n$ and $m$ being 2 to 4, with the proviso that when $n$ is 1 an organic polyisocyanate is included in the reaction mixture, with a member selected from the group consisting of hydroxyl polyesters, polyhydric polyalkylene ethers and polyhydric polythioethers.

7. A polyurethane plastic prepared by a process which comprises reacting an hydroxyl polyester, a polyhydric polyalkylene ether or polyhydric polythioether with an organic polyisocyanate and a phosphorus compound having the formula

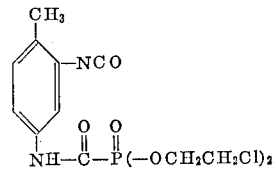

References Cited by the Examiner
UNITED STATES PATENTS

| | | | |
|---|---|---|---|
| 2,225,661 | 12/1940 | Schirm | 260—453 |
| 2,764,565 | 9/1956 | Hoppe et al. | 260—2.5 |
| 2,922,810 | 1/1960 | Toy et al. | 260—461 |
| 2,978,449 | 4/1961 | France et al. | 260—2.5 |
| 2,995,530 | 8/1961 | Frisch et al. | 260—2.5 |
| 3,013,048 | 12/1961 | Holtschmidt et al. | 260—461 |

LEON J. BERCOVITZ, *Primary Examiner.*

DONALD E. CZAJA, *Examiner.*